United States Patent
Jezierski, Jr.

(10) Patent No.: US 9,385,627 B2
(45) Date of Patent: Jul. 5, 2016

(54) UNIVERSAL POWER CONVERSION DEVICES FOR ALTERNATING CURRENT ELECTRIC APPARATUS

(71) Applicant: General Electric Company, Schenectady, NY (US)

(72) Inventor: Chester Stanley Jezierski, Jr., Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 14/492,170

(22) Filed: Sep. 22, 2014

(65) Prior Publication Data

US 2016/0087548 A1   Mar. 24, 2016

(51) Int. Cl.
*G05F 1/14* (2006.01)
*H02M 7/44* (2006.01)
*H01F 29/04* (2006.01)
*H02M 5/10* (2006.01)

(52) U.S. Cl.
CPC . *H02M 7/44* (2013.01); *G05F 1/14* (2013.01); *H01F 29/04* (2013.01); *H02M 5/10* (2013.01)

(58) Field of Classification Search
CPC ........... G05F 1/14; G05F 1/147; H01F 29/04; H02J 3/1878; H02M 5/10; H02M 7/44; H02P 13/06
See application file for complete search history.

(56) References Cited

U.S. PATENT DOCUMENTS

| | | | |
|---|---|---|---|
| 1,764,341 A | 6/1930 | Oplinger | |
| 3,993,943 A * | 11/1976 | Bratton | H02M 7/525 307/83 |
| 5,602,462 A * | 2/1997 | Stich | G05F 1/147 307/64 |
| 5,825,164 A * | 10/1998 | Williams | H02P 13/06 323/239 |
| 6,370,047 B1 | 4/2002 | Mallory | |
| 8,154,891 B1 | 4/2012 | Morico et al. | |
| 2001/0048356 A1* | 12/2001 | Owen | H01F 29/04 336/137 |
| 2002/0105816 A1* | 8/2002 | Boudrias | H02J 3/01 363/39 |
| 2009/0102438 A1* | 4/2009 | Raedy | G05F 1/20 323/258 |

FOREIGN PATENT DOCUMENTS

WO   WO 2012-040670   3/2012

* cited by examiner

*Primary Examiner* — Adolf Berhane
*Assistant Examiner* — Henry Lee, III
(74) *Attorney, Agent, or Firm* — Dority & Manning, P.A.

(57) ABSTRACT

The present disclosure is directed to universal power conversion devices for alternating current electric apparatus. One example power conversion device includes a plurality of transformers and a plurality of terminal blocks. The plurality of terminal blocks comprise at least an AC input terminal block for receiving an input alternating current signal and a primary coil terminal block. The primary coil terminal block has a plurality of output terminals respectively connected to a plurality of taps of a plurality of primary coils of the plurality of transformers. A plurality of jumpers respectively providing electrical connection between respective output terminals of the AC input terminal block and input terminals of the primary coil terminal block are selectively reconfigurable for reconfiguring a power conversion applied to the input alternating current signal by the power conversion device.

18 Claims, 19 Drawing Sheets

UNIVERSAL POWER CONVERSION DEVICES FOR ALTERNATING CURRENT ELECTRIC APPARATUS

FIELD OF THE INVENTION

The present disclosure relates generally to power conversion devices. More particularly, the present disclosure relates to universal power conversion devices for alternating current electric apparatus.

BACKGROUND OF THE INVENTION

One problem experienced by manufacturers of electrical apparatus that service various markets around the world is the non-standardized nature of input power voltage. For example, in certain countries such as the United States, alternating current power of about 120 volts is typically used as the input power signal. In certain other countries, alternating current power at about 220 or 230 volts may be most commonly available or used.

Furthermore, for certain electrical apparatus, the available input power can have characteristics (e.g. voltage and/or phase) that are specific to the particular context in which the electrical apparatus is intended to be used. For example, certain power storage systems can include an inverter that transforms stored direct current power (e.g. stored via a system of batteries) into alternating current power having certain characteristics. Such characteristics can be unique to the particular context in which the power storage system is used.

Thus, when designing electrical apparatus for international use or different customer contexts, the input power stage of the apparatus must frequently be customized to match the different supply voltages and/or number of phases that will be available at the intended location of apparatus usage.

This customization can require constant re-engineering and redesign of the apparatus for each customer or location at which the input power will be different. As a result, the purchase and stocking of small quantities of many different components such as transformers may be required, resulting in increased production costs due to the inability to leverage quantity discounts.

Furthermore, the use of different product models is inefficient from a manufacturing, inventory, and distribution perspective. For example, the manufacturer can be required to maintain different stock keeping units (SKUs) for each model configuration, thereby exponentially increasing the number of unique SKUs and introducing a level of redundancy. As another example, inventory tracking, sales, distribution, and other business activities must be managed for each configuration or in a customer-specific fashion, rather than for a single apparatus product as a whole. As such, a customer designation can be prevented from moving from one product to another to adjust shipment schedules.

Therefore, universal power conversion devices for alternating current electrical apparatus are needed.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a power conversion device. The power conversion device includes a plurality of transformers and a plurality of terminal blocks. The plurality of terminal blocks comprise at least an AC input terminal block for receiving an input alternating current signal and a primary coil terminal block. The primary coil terminal block has a plurality of output terminals respectively connected to a plurality of taps of a plurality of primary coils of the plurality of transformers. A plurality of jumpers respectively providing electrical connection between respective output terminals of the AC input terminal block and input terminals of the primary coil terminal block are selectively reconfigurable for reconfiguring a power conversion applied to the input alternating current signal by the power conversion device.

Another example aspect of the present disclosure is directed to a method for operating a power conversion device. The method includes accessing the power conversion device. The power conversion device includes a plurality of transformers. The power conversion device includes an AC input terminal block for receiving an input alternating current signal. The power conversion device includes a primary coil terminal block that has a plurality of output terminals respectively connected to a plurality of taps of a plurality of primary coils of the plurality of transformers. The method includes reconfiguring a plurality of jumpers respectively providing electrical connection between respective output terminals of the AC input terminal block and input terminals of the primary coil terminal block to reconfigure a power conversion applied to the input alternating current signal These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
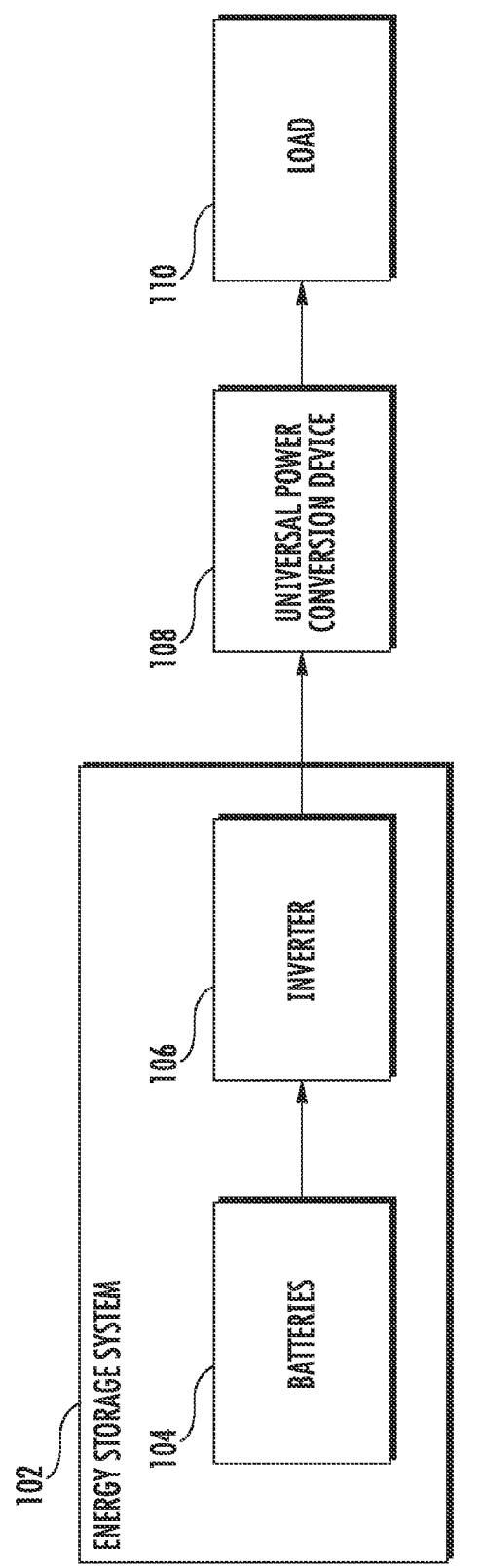
FIG. 1 depicts an example power conversion system according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents Generally, example aspects of the present disclosure are directed to universal power conversion devices for alternating current electrical apparatus. As an example, the device can include an arrangement of three multi-tap or variable transformers with terminal blocks. The power conversion device can enable the powering of an electrical apparatus from any one of multiple voltage sources of either single phase or polyphase (such as three phase power). In particular, by reconfiguring a set of wiring jumpers between two or more of the terminal blocks, the power conversion provided by the power conversion device can be quickly and easily reconfigured to transform the available input alternating current signal into one or more desired output alternating current signals.

More particularly, in some embodiments, an available input voltage can be matched to one or more desired load voltages by adjusting wiring jumpers between terminal blocks that connect to an arrangement of electrical transformers. In such fashion, a single product can be designed and produced and thereafter configured to accommodate the specific customer supply power at the final steps of production or installation. In particular, by the simple reconfiguration of the wiring jumpers between the terminal blocks, input power issues that would otherwise lead to multiple product models or configurations can be resolved. As such, a single product design can be fully tested and characterized and the use of untested configuration-specific components can be eliminated, thereby improving the robustness and reliability of the product while reducing warranty costs.

Furthermore, the components included in the power conversion device can be standardized, thereby leading to quantity discounts, reducing the number of SKUs, and decreasing inventory and storage costs. As such, configuration management is greatly simplified, reducing personnel costs and potential for errors. In addition, shipment schedules can be adjusted by moving a particular customer before or after other customers in the production stream since all the produces are identical. Reconfiguration, if required, can easily be accomplished by reconfiguring the wiring jumpers.

According to an aspect of the present disclosure, the universal power conversion device can include a plurality of transformers. For example, the transformers can be multi-tap or variable transformers. The transformers can be standardized off-the-shelf transformers or can be custom-wound transformers. The transformers included in the device can be selected to provide a wide range of potential power conversions.

As an example, in some embodiments, the power conversion device can include a first, a second, and a third transformer. Each of the first, second, and third transformers can include a first and second primary coil and a first and second secondary coil. In some embodiments, the first and second primary coils and the first and second secondary coils for each transformer can be independent windings that share a common core. In some embodiments, each primary coil for each transformer can include five taps and each secondary coil for each transformer can include two taps.

In other embodiments, six independent transformers can be used instead of the three multi-winding transformers. Other numbers or variations of transformers can be used, as well. Generally, the transformers can be selected to provide a wide range of different power conversion possibilities.

For example, in some embodiments, the transformers can be rated at both 50 Hertz and 60 Hertz to accommodate both standard worldwide frequencies. In other embodiments, a single frequency transformer can be appropriately derated to handle different frequencies. Further, in embodiments in which custom-wound transformers are used, input signals having many different frequencies could be accommodated, including, for example, input alternating current signals having a frequency of 400 Hertz (e.g. as used in some aviation applications).

As another example, in some embodiments, the plurality of transformers can feature fixed winding taps that accommodate continuous input voltage ranges of 174 to 240 volts and 348 to 480 volts, while maintaining the output voltage within ten percent of nominal. Further, in embodiments in which custom-wound transformers are used, the input voltage range can be expanded to any desired range.

However, use of the power conversion device is not limited to the particular rated voltages of the transformer windings, as any voltage up to the rated voltage can be used. As an example, off-the-shelf transformers rated at higher voltages than the voltages of the signals being transformed can be used if the turns ratio between primary and second windings is correct. For example, a 480 volt to 240 volt transformer could be included in the device and used to transform 240 volts to 120 volts. As such, in some embodiments, the input and output voltage ranges of the power conversion device can be increased using highly-available, low-cost, off-the-shelf transformers.

The universal power conversion device can also include a plurality of terminal blocks. The terminal blocks can provide terminals for securing electrical connections between various components of the power conversion device and external components, including, for example, an input power source, the transformers, and one or more loads that receive the output alternating current signals.

As an example, in some embodiments, the power conversion device can include an AC input terminal block that receives the input alternating current signal from an AC power source. For example, the AC input terminal block can have three input terminals electrically connected to three output terminals.

In some embodiments, the AC power source can be associated with an energy storage system. As an example, the energy storage system can include a plurality of batteries configured in series, in an array, or other configurations. The plurality of batteries can provide a direct current signal to an inverter which is controlled or programmed to convert the direct current signal into an alternating current signal. The alternating current signal can be provided from the inverter to the AC input terminal block as the input alternating current signal.

The power conversion device can also include a primary coil terminal block that provides an electrical interface with the taps of the primary coils of the transformers of the power conversion device. As an example, in some embodiments, the primary coil terminal block can have thirty input terminals respectively connected to thirty output terminals. The thirty output terminals can be respectively connected to the taps of the primary coils of the transformers of the device. Thus, the input terminals of the primary coil terminal block can be used to select various taps of the primary coils for which electrical connection is desired.

According to an aspect of the present disclosure, a plurality of jumpers can be used to respectively electrically connect various output terminals of the AC input terminal block with various input terminals of the primary coil terminal block. In particular, the plurality of jumpers can be selectively reconfigurable to reconfigure a power conversion performed by the transformers. Thus, by reconfiguring the jumpers to apply the input alternating current signal to different taps of the primary coils of the transformers, the characteristics of the output alternating current signals can be modified and reconfigured to meet desired output characteristics (e.g. desired voltage or phase characteristics) and various different input signals can be accommodated. In some embodiments, other jumpers between other terminal blocks can be reconfigured to provide additional options as well.

In some embodiments of the present disclosure, the power conversion device can also include a secondary coil terminal block and an AC output terminal block. The secondary coil terminal block can provide an electrical interface with the taps of the secondary coils of the transformers of the power conversion device. The AC output terminal block can provide electrical connections for connecting one or more loads to one or more output alternating current signals.

In some embodiments of the present disclosure, the universal power conversion device can convert the input alternating current signal into a first, second, and third output alternating current signal. As an example, the AC output terminal block can have nine output terminals. The first output alternating current signal can be accessed via output terminals one through three; the second output alternating current signal can be accessed via output terminals four through six; and the third output alternating current signal can be accessed via output terminals seven through nine.

In some embodiments, three independent loads can respectively receive the first, second, and third output alternating current signals. In other embodiments, certain input or output terminals of the AC output terminal block can be electrically connected so that the first, second, and third output alternating current signals are combined to provide a wye connection or a delta connection for a single three phase load.

In yet other embodiments, the first, second, and third output alternating current signals can be combined to provide a parallel or series connection for a single phase load. In addition, in some embodiments, the first, second, and third output alternating current signals can be combined in parallel to provide current sharing by the first, second, and third transformers of the device for first, second, and third independent loads. Furthermore, the devices of the present disclosure can be expanded to accommodate or otherwise achieve any number of phases in a polyphase system, including two phase, six phase, or other phase characteristics.

In further embodiments, the universal power conversion devices of the present disclosure can be configured to perform load leveling, peak shaving, frequency regulation, and/or other power conversion functions.

Thus, the universal power conversion devices of the present disclosure are capable of being quickly and easily reconfigured, thereby providing the potential for many different power conversions from a single device and eliminating the need for customized product models for particular customer demands. In addition, the power conversion device can be built using widely-available, low-cost parts. Further, in some embodiments, the device does not include any electronic components that may increase the expense, complexity, or risk of failure of the device. For example, the device performs an AC to AC conversion and does not require an inverter or other complex components.

With reference now to the FIGS., example embodiments of the present disclosure will be discussed in further detail. The particular configurations shown in the FIGS. are provided as example configurations only. Many different configurations providing many different power conversions not explicitly shown in the FIGS. can be achieved through various reconfigurations of the universal power conversion device of the present disclosure.

FIG. 1 depicts an example power conversion system according to an example embodiment of the present disclosure. The power conversion system can include an energy storage system 102, a universal power conversion device 108, and a load 110. The universal power conversion device 108 can be reconfigurable to apply one of a plurality of different available power conversions to an input alternating current signal received from the energy storage system 102.

As one example, in some embodiments, the universal power conversion device 108 can include an arrangement of three multi-tap or variable transformers with terminal blocks. By reconfiguring a set of wiring jumpers between two or more of the terminal blocks, the power conversion provided by the universal power conversion device 108 can be quickly and easily reconfigured to transform the input alternating current signal into one or more desired output alternating current signals.

As another example, in some embodiments, the universal power conversion device 108 can include an AC input terminal block that receives the input alternating current signal from the energy storage system 102. The universal power conversion device 108 can also include a primary coil terminal block that provides an electrical interface with one or more taps of one or more primary coils of one or more transformers included within the universal power conversion device 108. A plurality of jumpers can be used to respectively electrically connect various output terminals of the AC input terminal block with various input terminals of the primary coil terminal block. In particular, the plurality of jumpers can be selectively reconfigurable to reconfigure a power conversion performed by the transformers. Thus, by reconfiguring the jumpers to apply the input alternating current signal to different taps of the primary coils of the transformers, the characteristics of the output alternating current signals can be modified and reconfigured to meet desired output characteristics (e.g. desired voltage or phase characteristics) and various different input signals can be accommodated. In some embodiments, other jumpers between other terminal blocks can be reconfigured to provide additional options as well.

Thus, by applying the selected power conversion to the input alternating current signal received from the energy storage system 102, the universal power conversion device 108 can transform the input alternating current signal into an output alternating current signal that has different voltage and/or phase characteristics from the input alternating current signal. The universal power conversion device 108 can be electrically connected to the load 110, such that the output alternating current signal is applied across the load 110.

Furthermore, as shown in FIG. 1, in some embodiments, the energy storage system 102 can store energy within a plurality of batteries 104. The batteries can be connected in series, in parallel, in an array, or in other configurations. The batteries can be any type of battery for storing energy, including, for example, metal salt batteries. The batteries can provide a direct current signal.

The direct current signal output by batteries 104 can be provided to an inverter 106. The inverter 106 can transform the direct current signal output by the batteries 104 into an alternating current signal. In particular, the inverter 106 can be electrically connected to the universal power conversion device 108 such that the alternating current signal output by the inverter 106 is used as the input alternating current signal to the universal power conversion device 108.

Thus, as an example, through use (e.g. reconfiguration) of the universal power conversion device 108, an alternating current signal output by the energy storage system 102 can be modified to meet desired output characteristics (e.g. desired voltage or phase characteristics).

Figure 2:
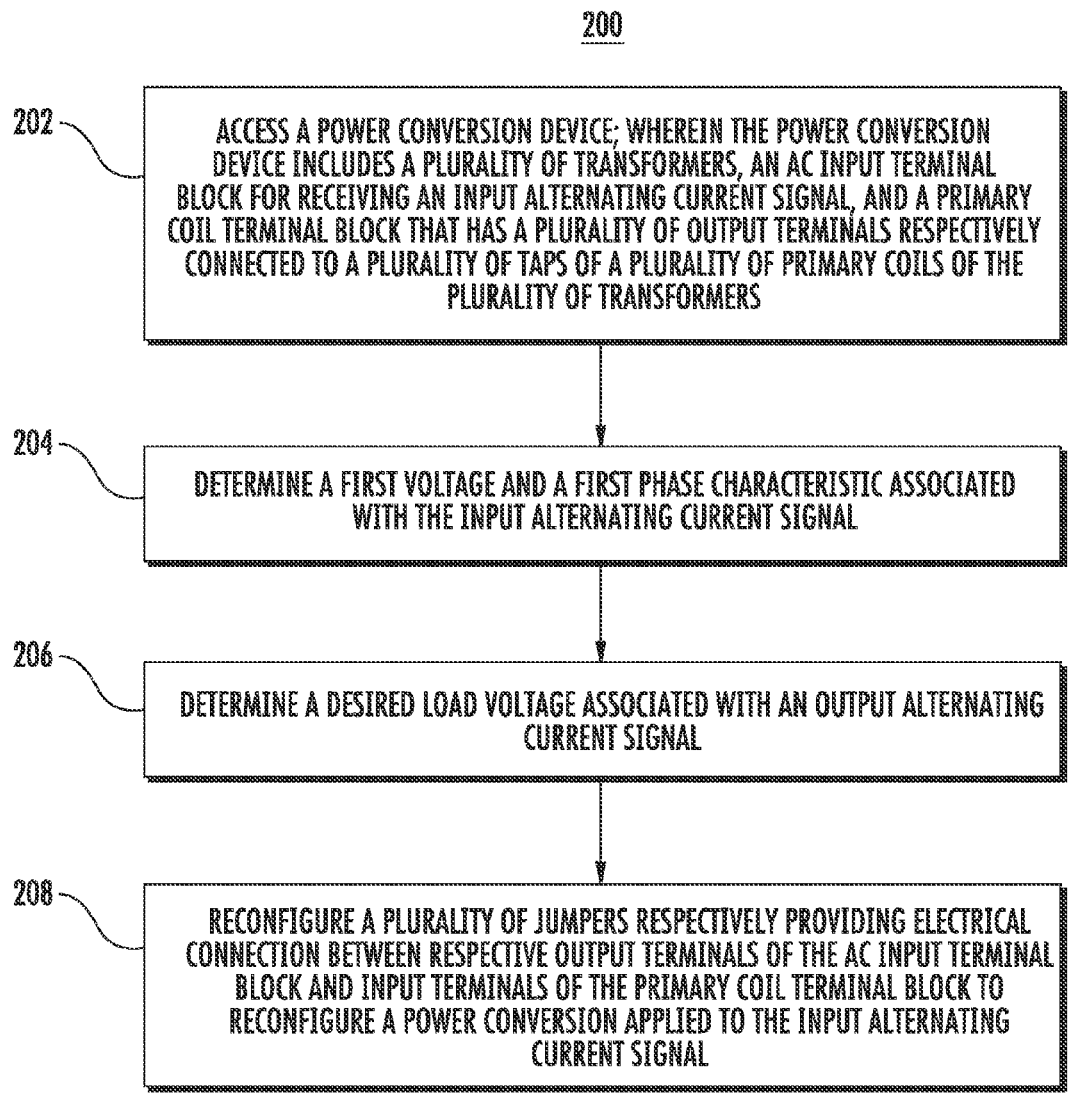
FIG. 2 depicts a flow chart of an example method for operating a power conversion device according to an example embodiment of the present disclosure.

FIG. 2 depicts a flow chart of an example method (200) for operating a power conversion device according to an example embodiment of the present disclosure.

At (202) the power conversion device can be provided. As an example, in some embodiments, the power conversion device can include a plurality of transformers; an AC input terminal block for receiving an input alternating current power signal; and a primary coil terminal block that has a plurality of output terminals respectively connected to a plurality of taps of a plurality of primary coils of the plurality of transformers.

As one example, the power conversion device can be provided at (202) by electrically connecting the power conversion device between an energy storage system and a load. For example, an inverter of the energy storage system can be electrically connected to the AC input terminal block. An alternating current signal output by the inverter can be received by the AC input terminal block as the input alternating current signal.

At (204) a first voltage and a first phase characteristic associated with the input alternating current signal can be determined.

At (206) a desired load voltage associated with an output alternating current signal to be output by the power conversion device can be determined. In some embodiments, a desired phase characteristic associated with the output alternating current signal can be determined at (206) as well.

At (208) a plurality of jumpers respectively providing electrical connection between respective output terminals of the AC input terminal block and input terminals of the primary coil terminal block can be reconfigured so as to reconfigure a power conversion applied to the input alternating current signal. In particular, the power conversion device can be reconfigured based on the respective input and output voltage and phase characteristics determined at (204) and (206). In such fashion, the input alternating current signal can be transformed to meet the desired load voltage and or load phase characteristics.

Figure 3:
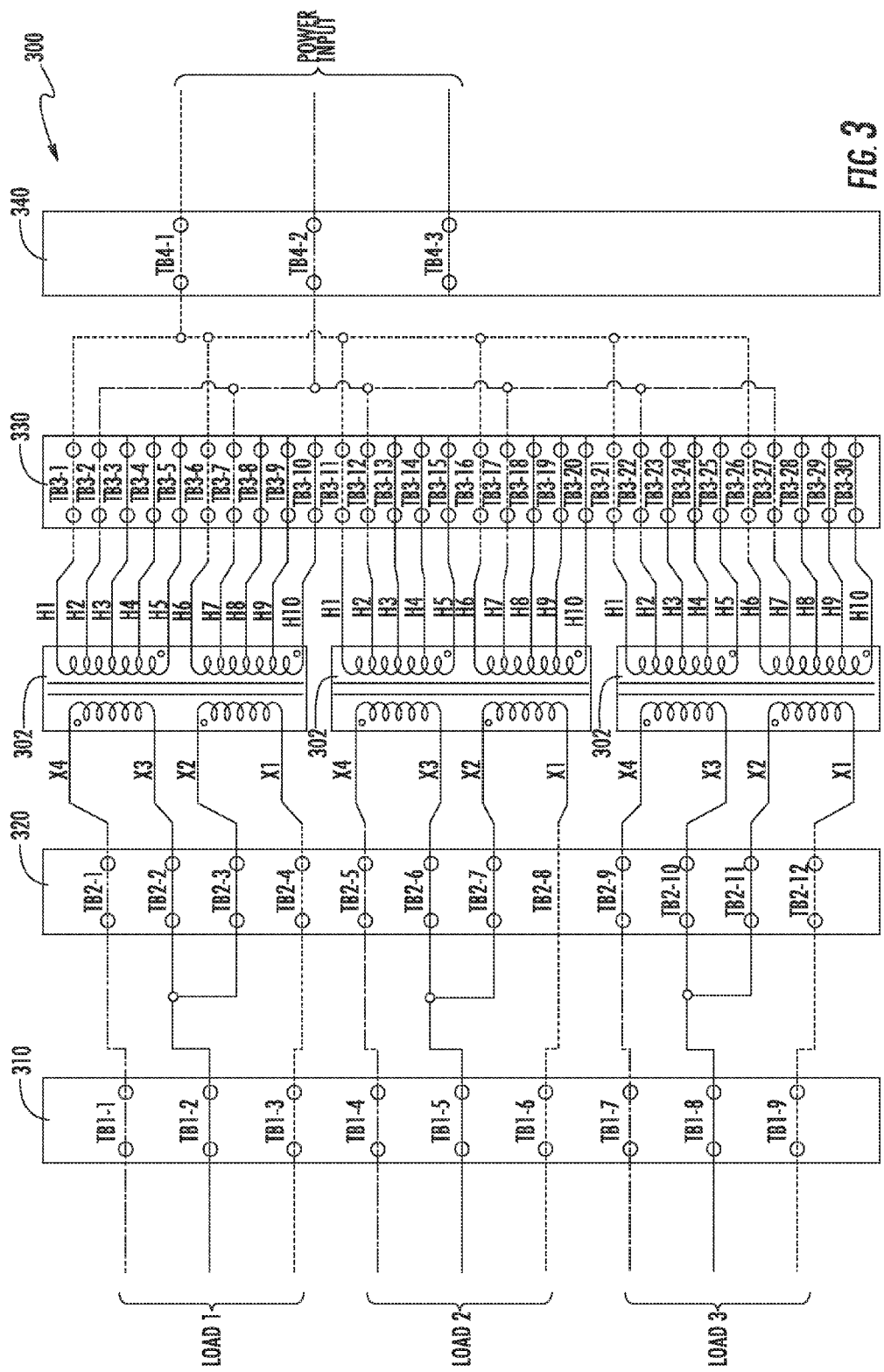
FIG. 3 depicts a first example configuration of a universal power conversion device according to an example embodiment of the present disclosure.

FIG. 3 depicts a first example configuration of a universal power conversion device 300 according to an example embodiment of the present disclosure. In particular, the first example configuration allows for the transformation of a 174 to 190 VAC, single phase input signal into three 240 VAC, single phase output signals.

As shown in FIG. 3, the power conversion device 300 can include three transformers 302 and four terminal blocks 310, 320, 330 and 340. Each transformer 302 can have two primary coils and two secondary coils. For example, the coils can be independent windings that share a core. Each secondary coil can have two taps while each primary coil can have five taps. The transformers 302 can respectively transform the input signal into the three output signals.

A fourth terminal block 340 can receive the input power signal from a power source. In some embodiments, the power source can be an inverter that transforms DC power from a battery grid into the input alternating current signal. A third terminal block 330 can electrically interface with the taps of the primary coils of the transformers 302.

A plurality of wiring jumpers can connect particular output terminals of the fourth terminal block 340 with particular input terminals of the third terminal block 330. According to an aspect of the present disclosure, the plurality of wiring jumpers can be respectively reconfigurable to achieve other configurations, such as the other example configurations of FIGS. 4-19.

The power conversion device 300 can also include a second terminal block 320 that electrically interfaces with the taps of the secondary coils of the transformers 302. The power conversion device 300 can also include a first terminal block 310 that provides enables a connection between three loads and the three output signals. In some embodiments, certain terminals of the first terminal block 310 and second terminal block 320 can be electrically connected using reconfigurable wiring jumpers. In other embodiments, the connections between the first and second terminal blocks are not reconfigurable.

Furthermore, although FIG. 3 depicts three independent output signals, the output signals can be wired or otherwise combined into parallel or series for a single phase load or wired or otherwise combined into a wye connection or a delta connection for a three phase load.

As an example, for a parallel output connection for a single phase load, terminals TB1-1, TB1-4, and TB1-7 can be connected together for line 1; terminals TB1-2, TB1-5, and TB1-8 can be connected together for the center tap (if desired); and terminals TB1-3, TB1-6, and TB1-9 can be connected together for line 2.

As another example, for a series output connection for a single phase load, many combinations are possible to match a desired load voltage. For example, terminals TB1-2 or TB1-3 can be connected to TB1-4 or TB1-5, with the output taken from TB1-1 and TB1-6.

As another example, for a wye output connection for a three phase load, terminals TB1-1 and TB1-6 can be connected together for line 1; TB1-3 and TB1-7 can be connected together for line 2; TB1-4 and TB1-9 can be connected together for line 3; and TB1-2, TB1-5 and TB1-8 can be connected together for neutral.

As another example, for a delta output connection for a three phase load, the same connections as discussed above for the wye connection can be used, minus the neutral connection.

The above noted variations on the output signals to provide parallel, series, wye, or delta outputs can be applied to any of the example configurations of the present disclosure. Furthermore, as will be discussed further with respect to FIG. 19, in some embodiments, the output signals can be paralleled on the input side of the first terminal block to provide current sharing across the first, second, and third transformers for three different loads.

Figure 4:
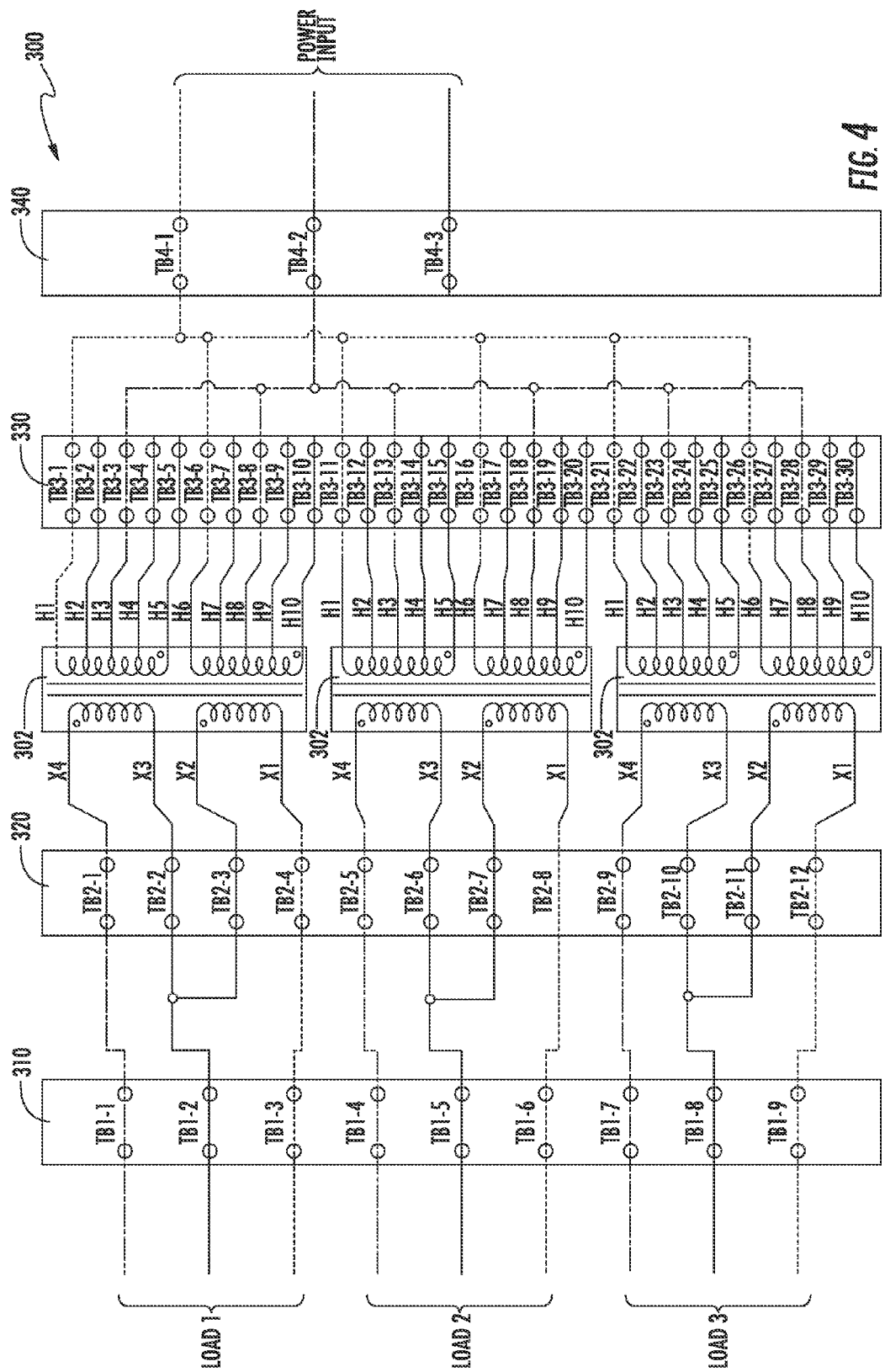
FIG. 4 depicts a second example configuration of a universal power conversion device according to an example embodiment of the present disclosure.

FIG. 4 depicts a second example configuration of a universal power conversion device according to an example embodiment of the present disclosure. In particular, the second example configuration allows for the transformation of a 191 to 208 VAC, single phase input signal into three 240 VAC, single phase output signals.

Figure 5:
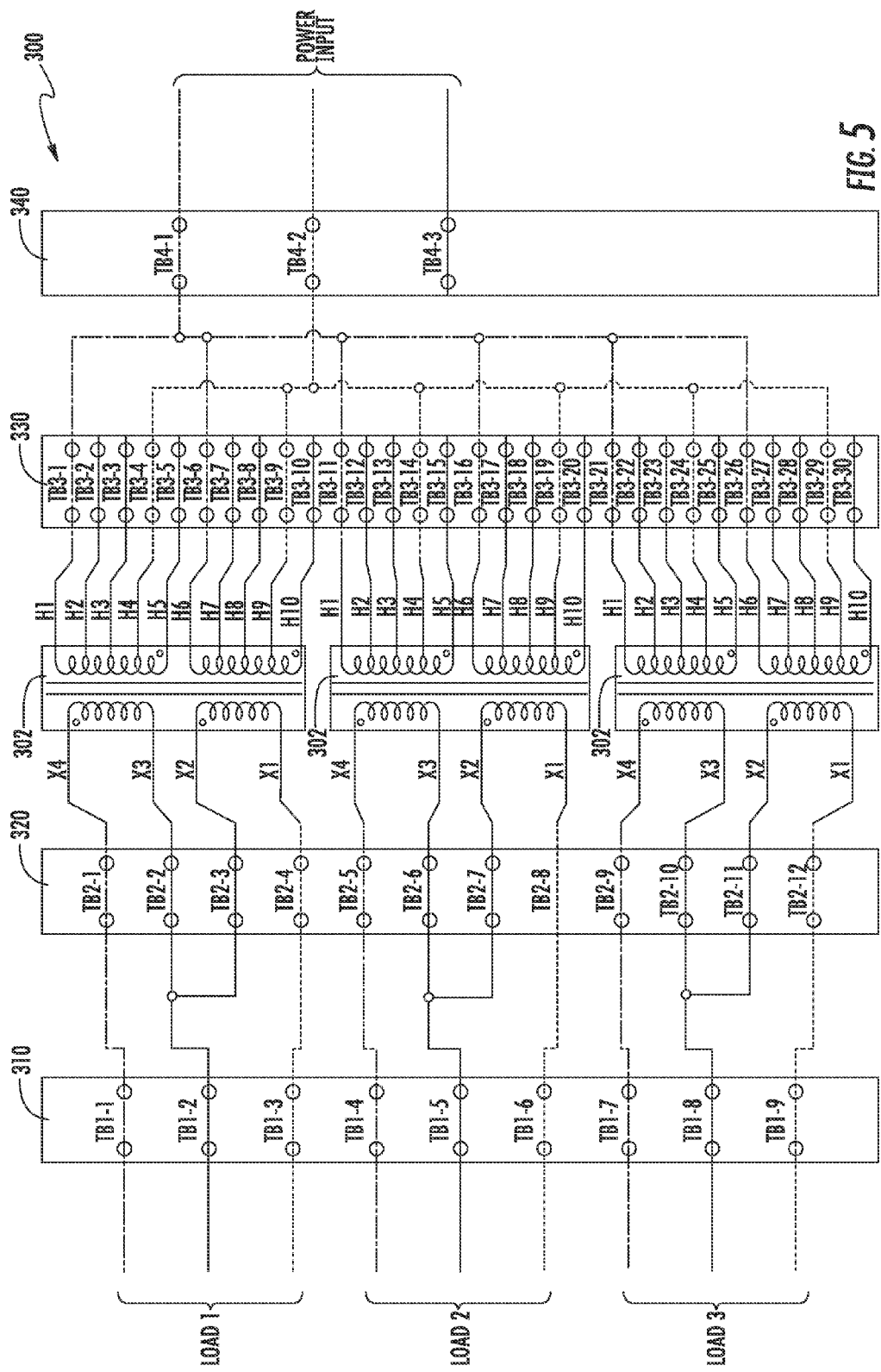
FIG. 5 depicts a third example configuration of a universal power conversion device according to an example embodiment of the present disclosure.

FIG. 5 depicts a third example configuration of a universal power conversion device according to an example embodiment of the present disclosure. In particular, the third example configuration allows for the transformation of a 209 to 220 VAC, single phase input signal into three 240 VAC, single phase output signals.

Figure 6:
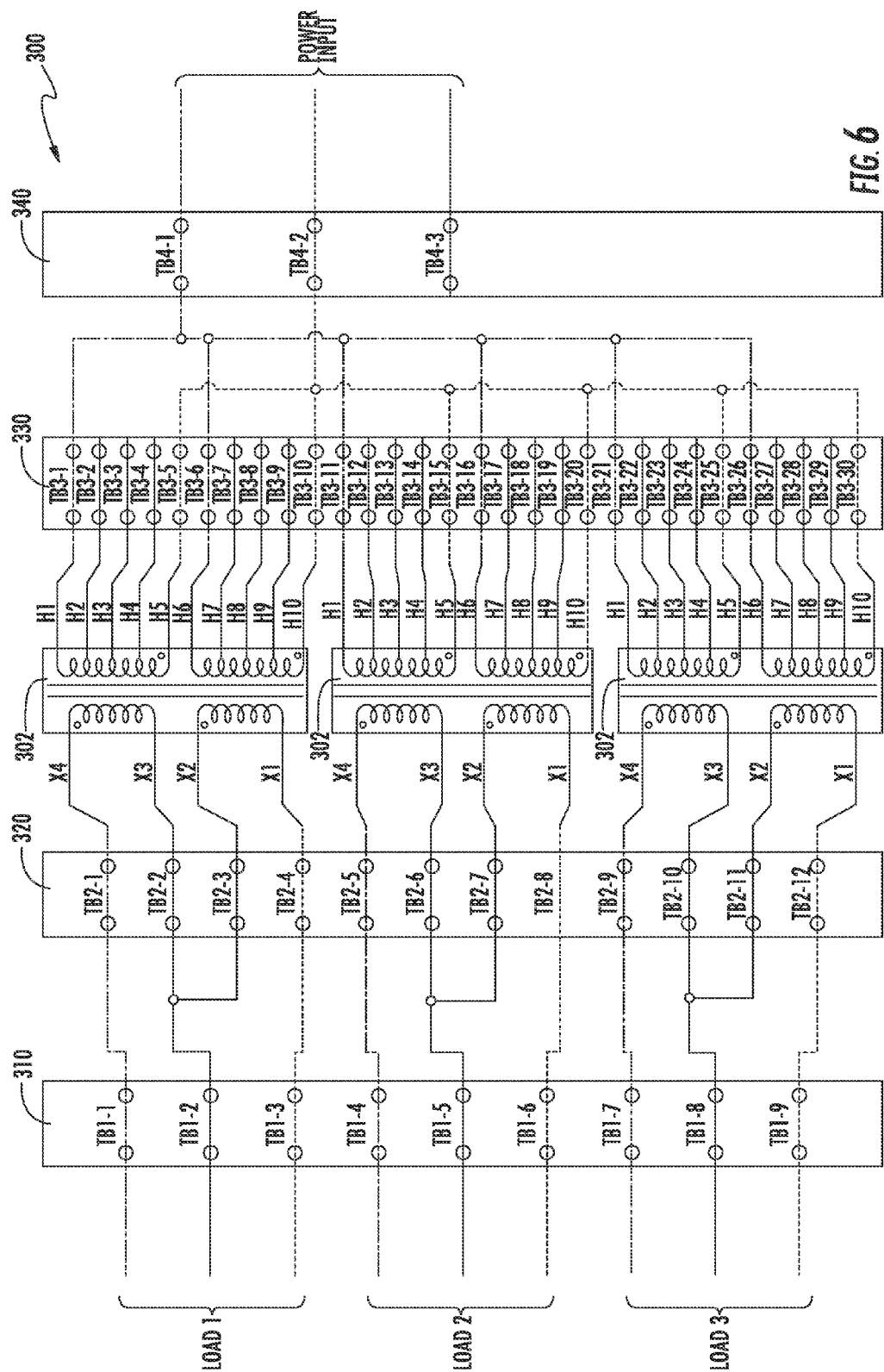
FIG. 6 depicts a fourth example configuration of a universal power conversion device according to an example embodiment of the present disclosure.

FIG. 6 depicts a fourth example configuration of a universal power conversion device according to an example embodiment of the present disclosure. In particular, the fourth example configuration allows for the transformation of a 221 to 240 VAC, single phase input signal into three 240 VAC, single phase output signals.

Figure 7:
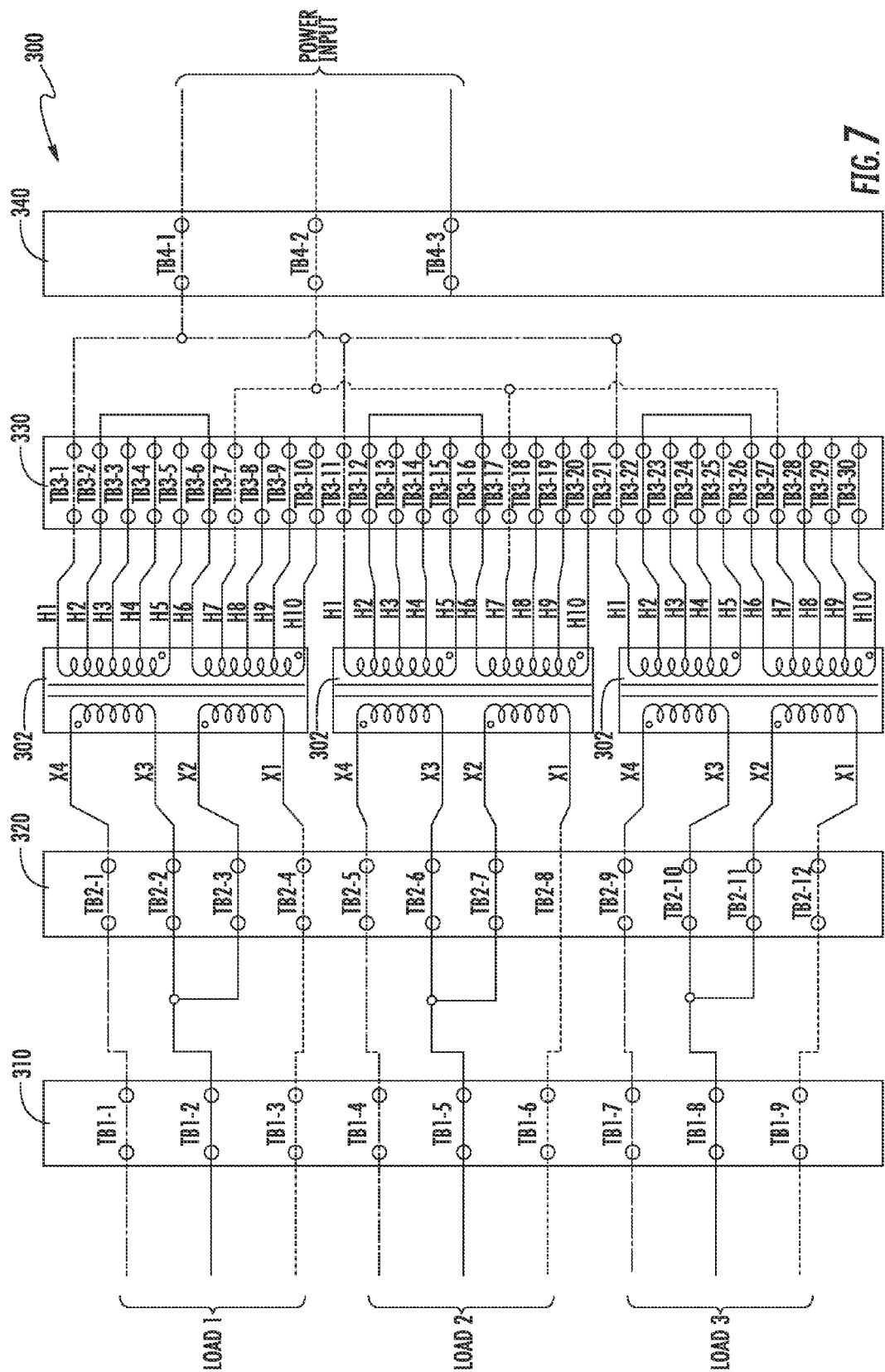
FIG. 7 depicts a fifth example configuration of a universal power conversion device according to an example embodiment of the present disclosure.

FIG. 7 depicts a fifth example configuration of a universal power conversion device according to an example embodiment of the present disclosure. In particular, the fifth example configuration allows for the transformation of a 348 to 380 VAC, single phase input signal into three 240 VAC, single phase output signals.

Figure 8:
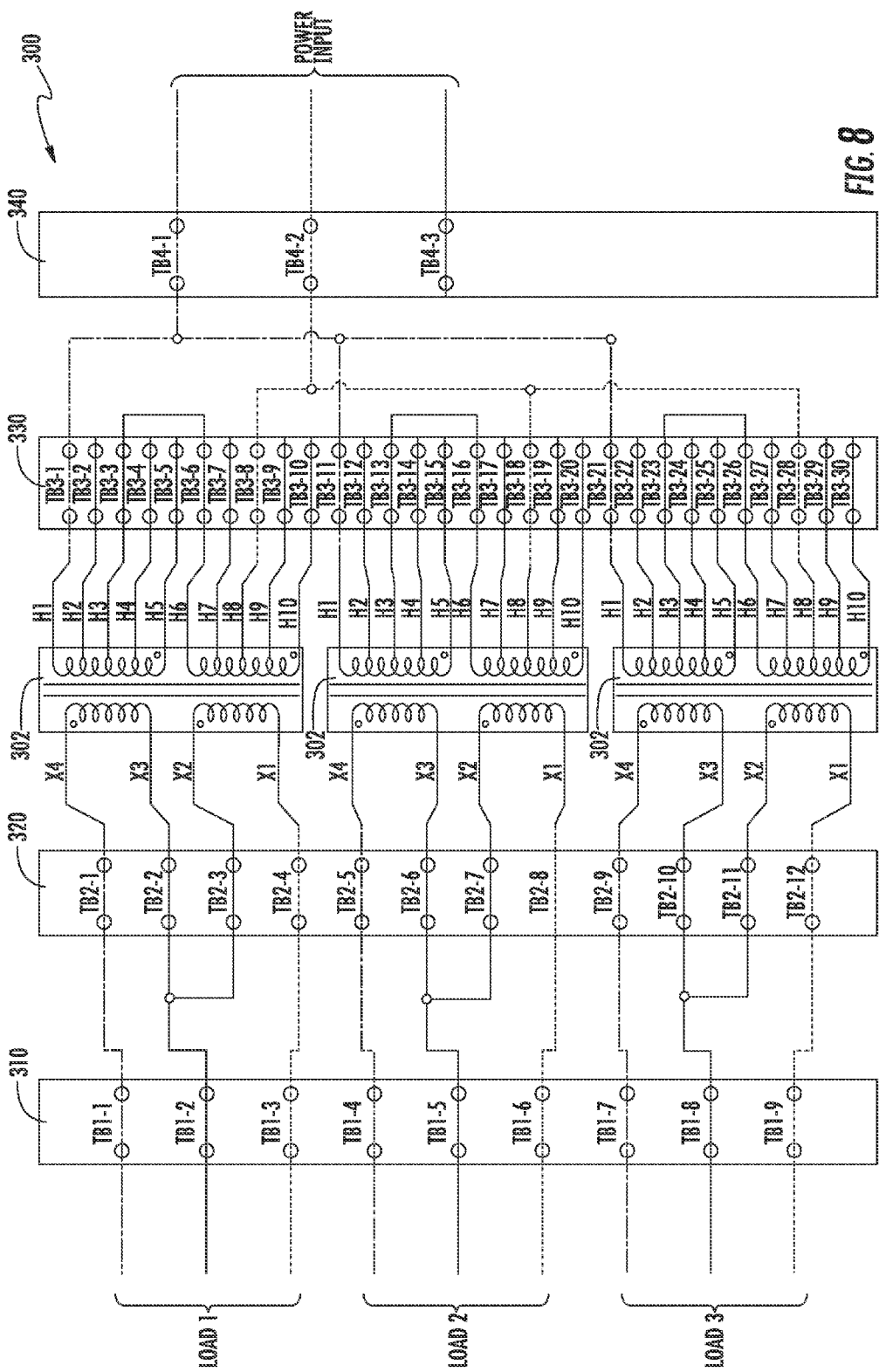
FIG. 8 depicts a sixth example configuration of a universal power conversion device according to an example embodiment of the present disclosure.

FIG. 8 depicts a sixth example configuration of a universal power conversion device according to an example embodiment of the present disclosure. In particular, the sixth example configuration allows for the transformation of a 381 to 416 VAC, single phase input signal into three 240 VAC, single phase output signals.

Figure 9:
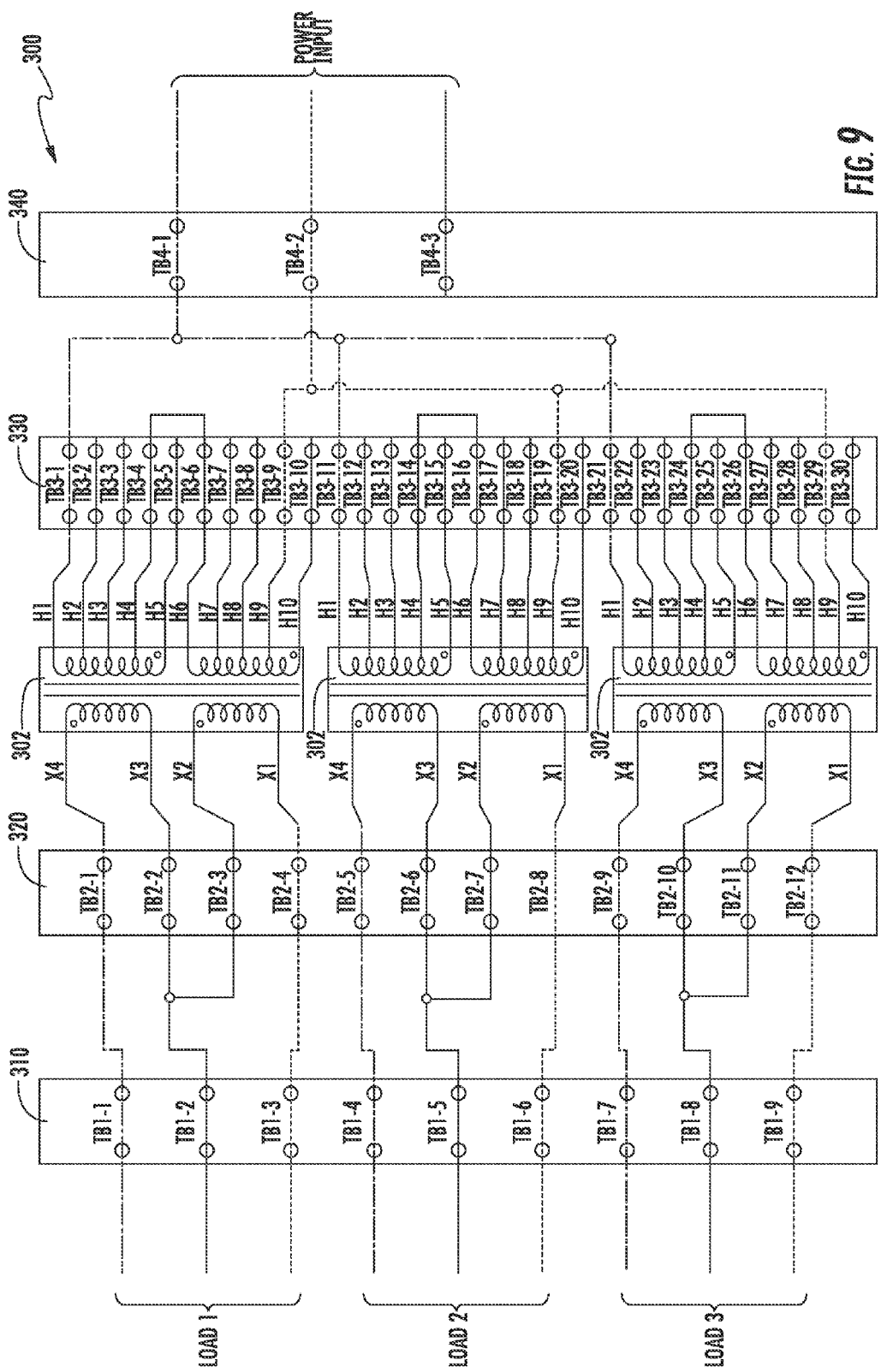
FIG. 9 depicts a seventh example configuration of a universal power conversion device according to an example embodiment of the present disclosure.

FIG. 9 depicts a seventh example configuration of a universal power conversion device according to an example embodiment of the present disclosure. In particular, the seventh example configuration allows for the transformation of a 417 to 440 VAC, single phase input signal into three 240 VAC, single phase output signals.

Figure 10:
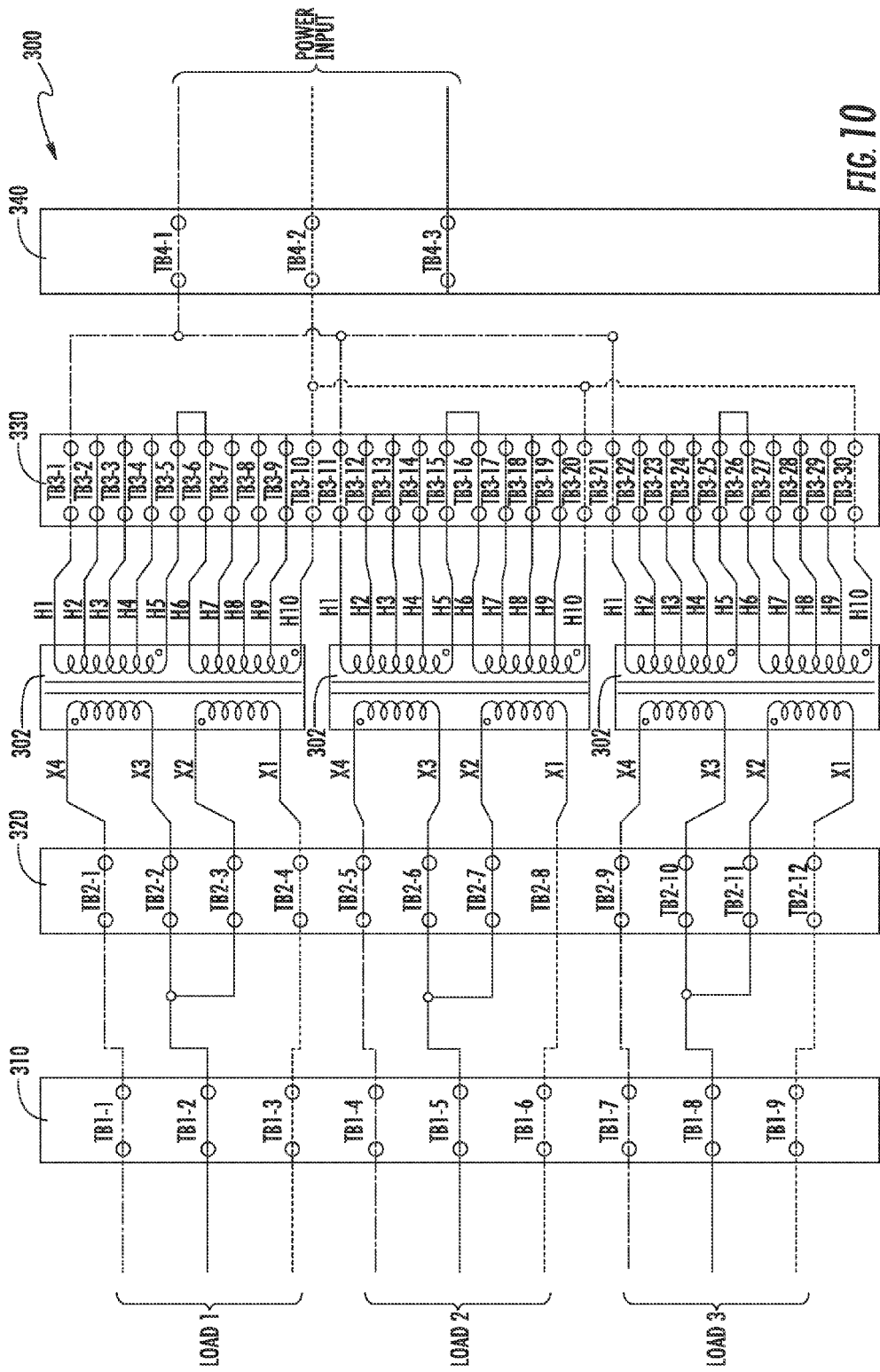
FIG. 10 depicts an eighth example configuration of a universal power conversion device according to an example embodiment of the present disclosure.

FIG. 10 depicts an eighth example configuration of a universal power conversion device according to an example embodiment of the present disclosure. In particular, the eighth example configuration allows for the transformation of a 441 to 480 VAC, single phase input signal into three 240 VAC, single phase output signals.

Figure 11:
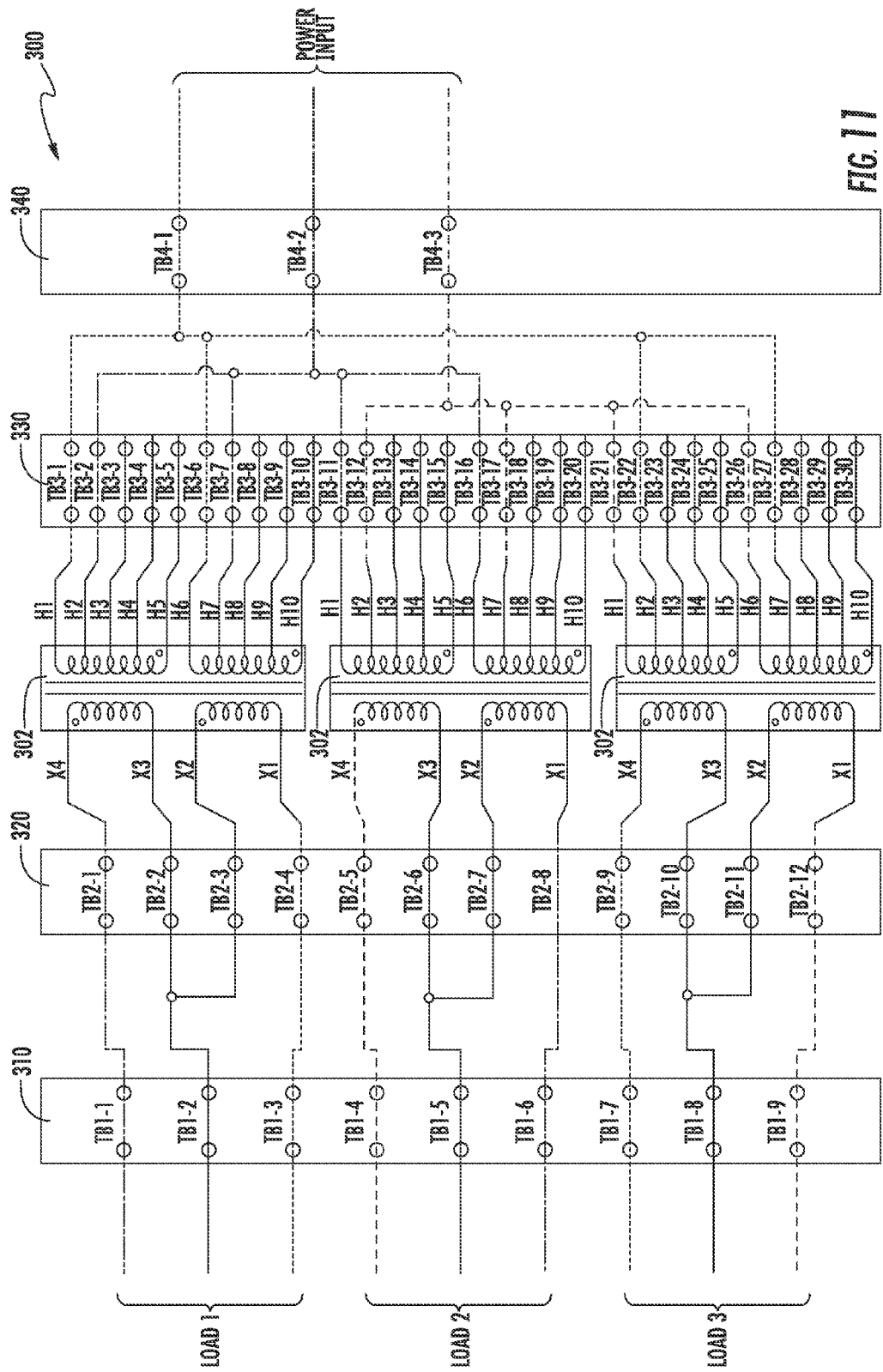
FIG. 11 depicts a ninth example configuration of a universal power conversion device according to an example embodiment of the present disclosure.

FIG. 11 depicts a ninth example configuration of a universal power conversion device according to an example embodiment of the present disclosure. In particular, the ninth example configuration allows for the transformation of a 174 to 190 VAC, three phase input signal into three 240 VAC, single phase output signals.

Figure 12:
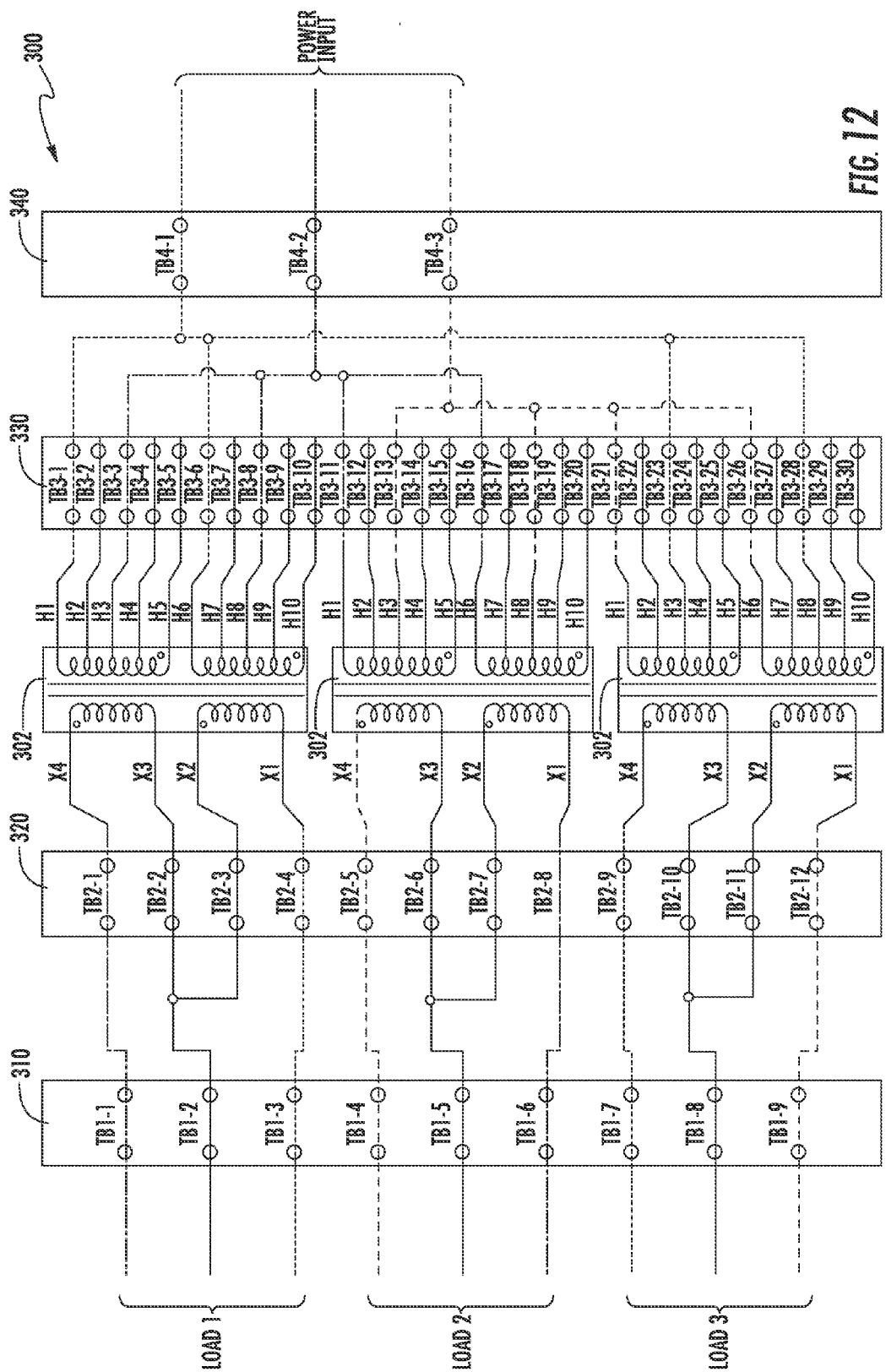
FIG. 12 depicts a tenth example configuration of a universal power conversion device according to an example embodiment of the present disclosure.

FIG. 12 depicts a tenth example configuration of a universal power conversion device according to an example embodiment of the present disclosure. In particular, the tenth example configuration allows for the transformation of a 191 to 208 VAC, three phase input signal into three 240 VAC, single phase output signals.

Figure 13:
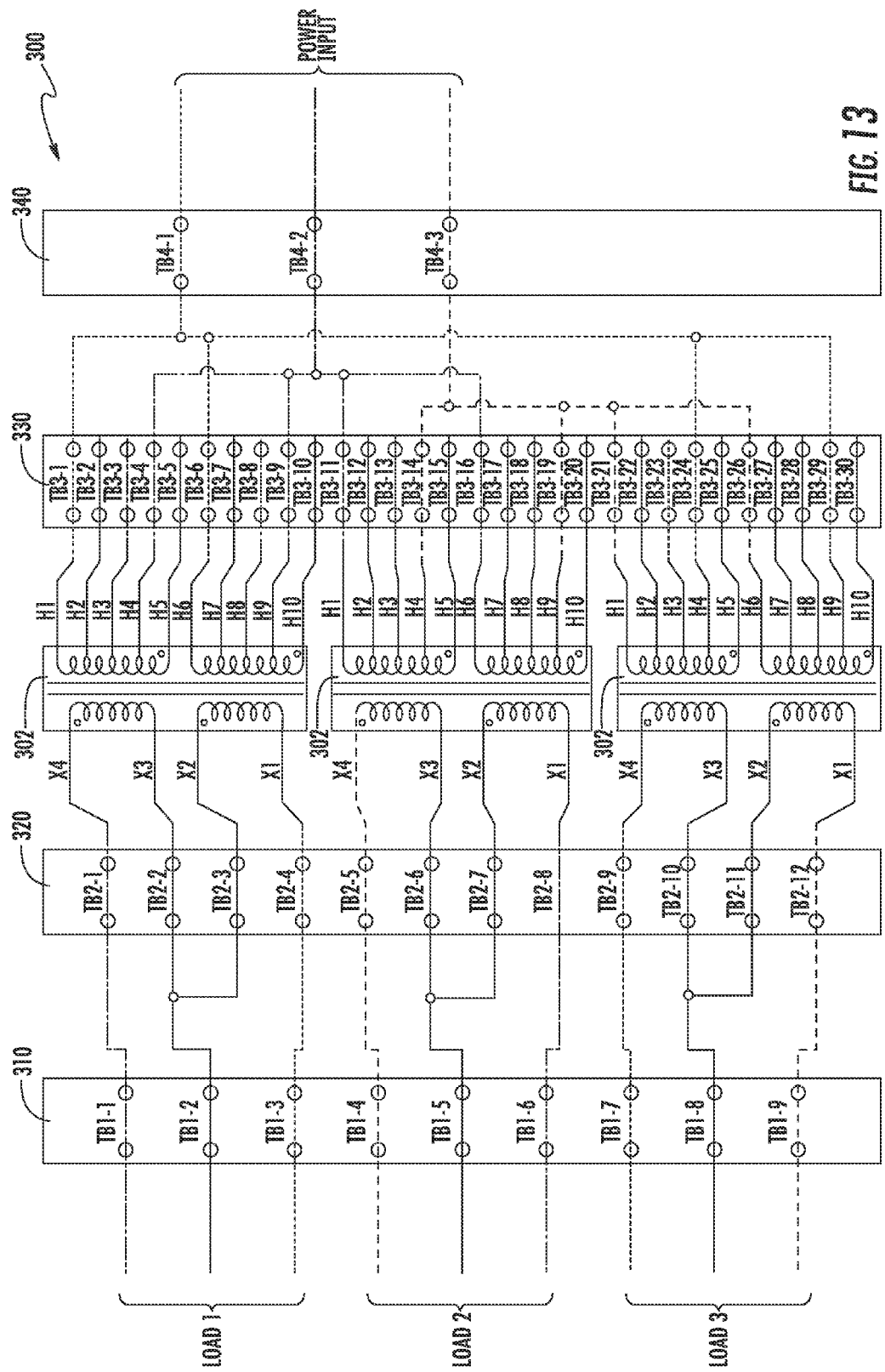
FIG. 13 depicts an eleventh example configuration of a universal power conversion device according to an example embodiment of the present disclosure.

FIG. 13 depicts an eleventh example configuration of a universal power conversion device according to an example embodiment of the present disclosure. In particular, the eleventh example configuration allows for the transformation of a 209 to 220 VAC, three phase input signal into three 240 VAC, single phase output signals.

Figure 14:
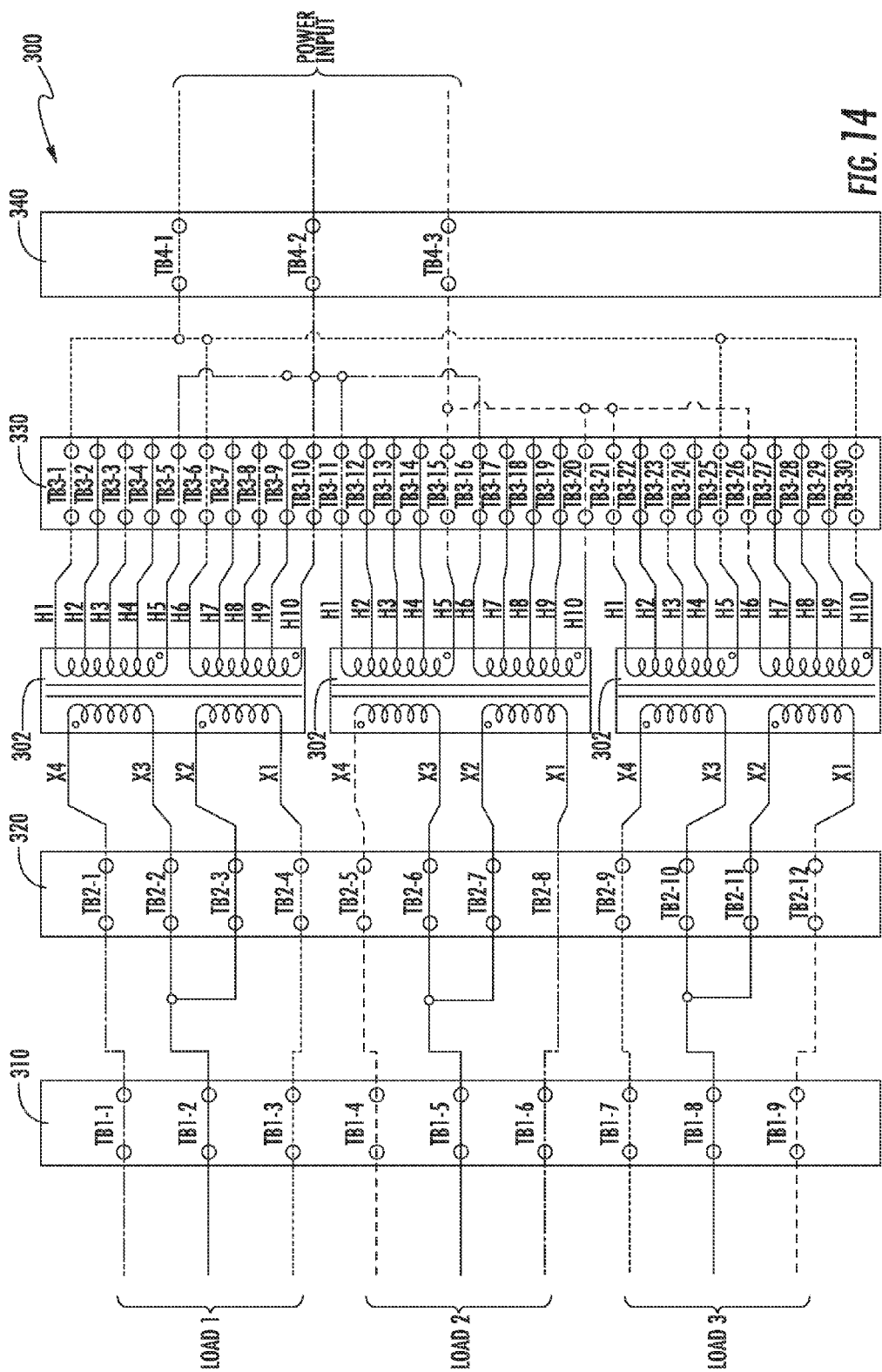
FIG. 14 depicts a twelfth example configuration of a universal power conversion device according to an example embodiment of the present disclosure.

FIG. 14 depicts a twelfth example configuration of a universal power conversion device according to an example embodiment of the present disclosure. In particular, the twelfth example configuration allows for the transformation of a 221 to 240 VAC, three phase input signal into three 240 VAC, single phase output signals.

Figure 15:
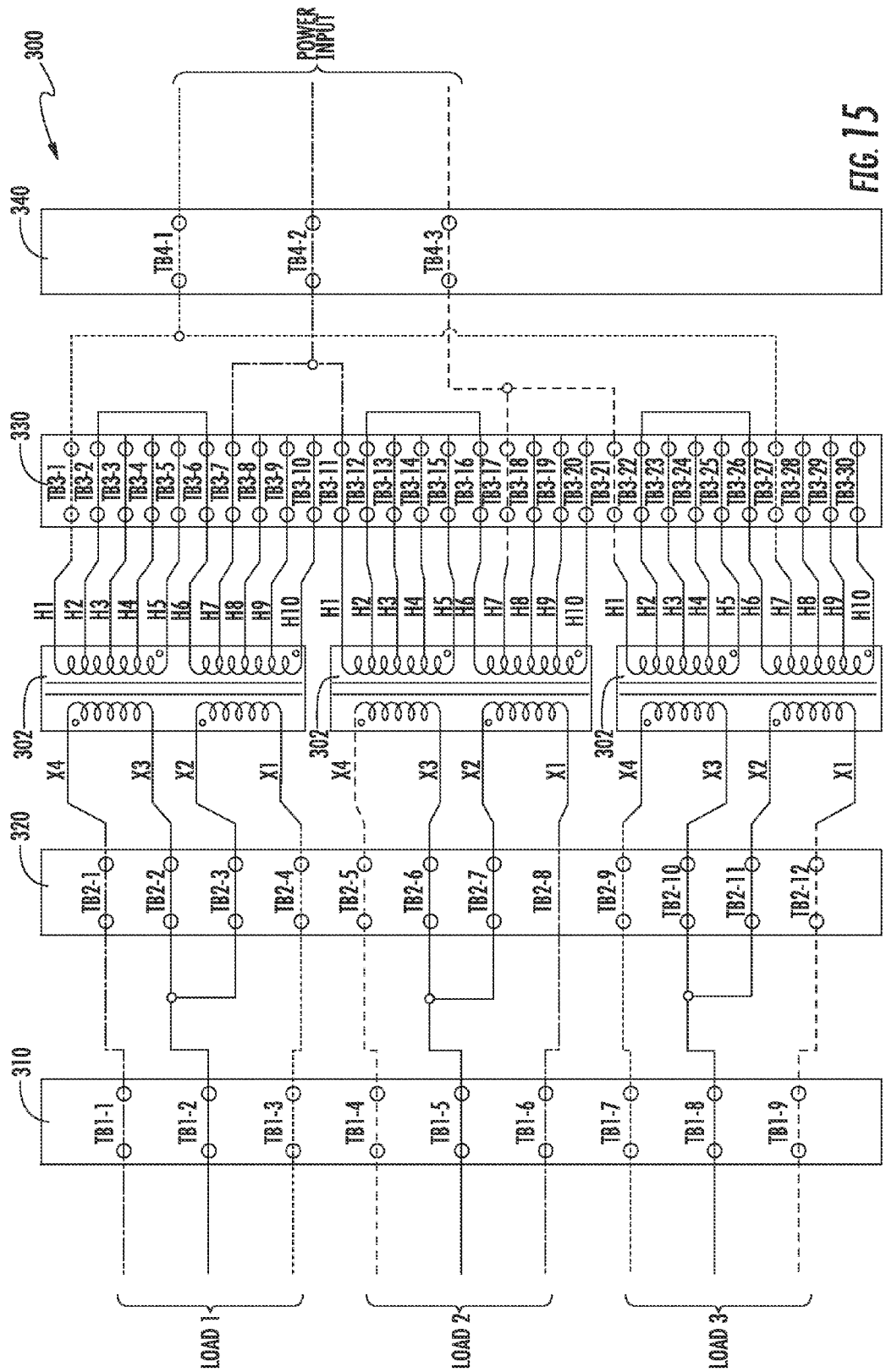
FIG. 15 depicts a thirteenth example configuration of a universal power conversion device according to an example embodiment of the present disclosure.

FIG. 15 depicts a thirteenth example configuration of a universal power conversion device according to an example embodiment of the present disclosure. In particular, the thirteenth example configuration allows for the transformation of a 348 to 380 VAC, three phase input signal into three 240 VAC, single phase output signals.

Figure 16:
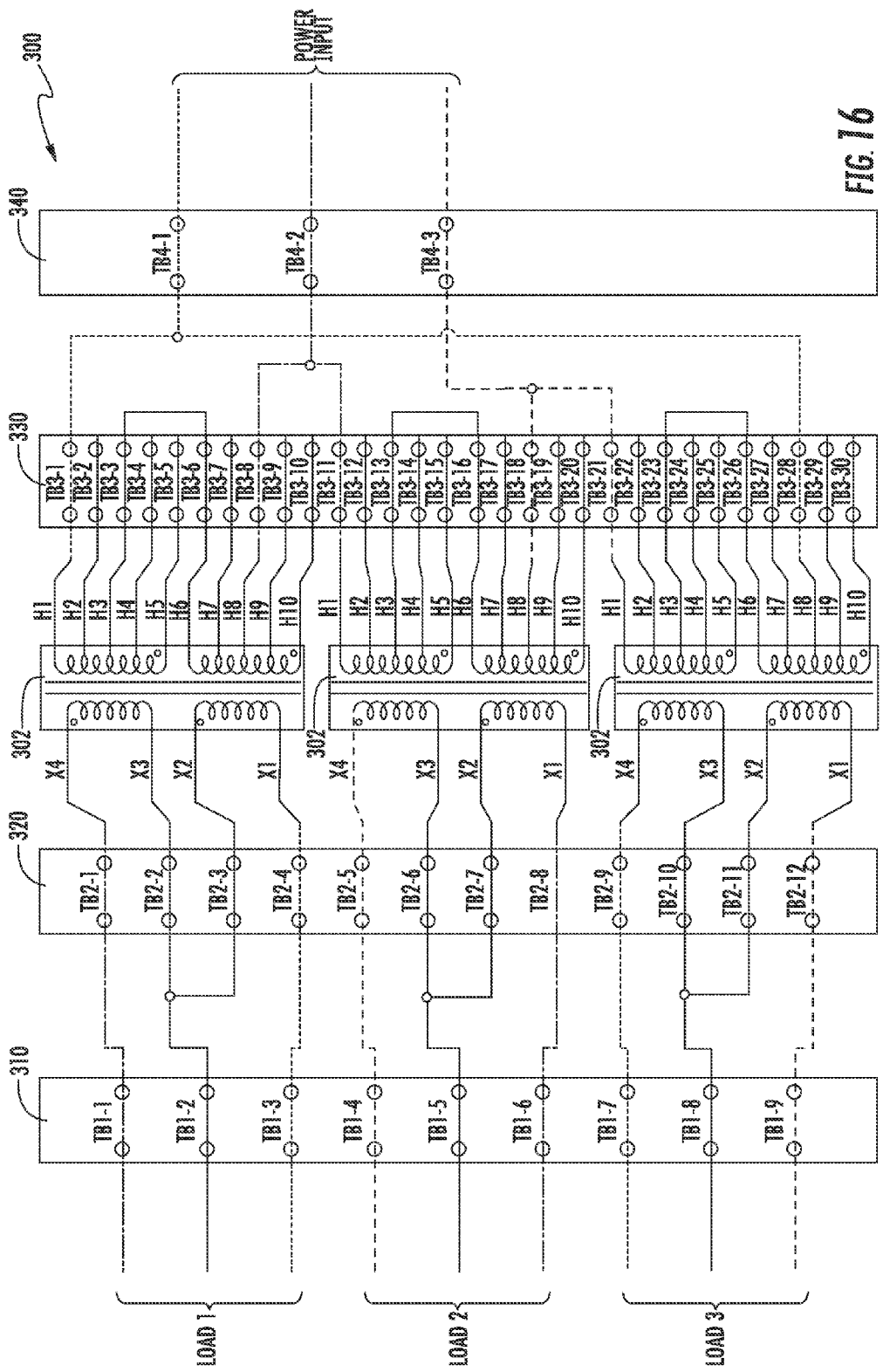
FIG. 16 depicts a fourteenth example configuration of a universal power conversion device according to an example embodiment of the present disclosure.

FIG. 16 depicts a fourteenth example configuration of a universal power conversion device according to an example embodiment of the present disclosure. In particular, the fourteenth example configuration allows for the transformation of a 381 to 416 VAC, three phase input signal into three 240 VAC, single phase output signals.

Figure 17:
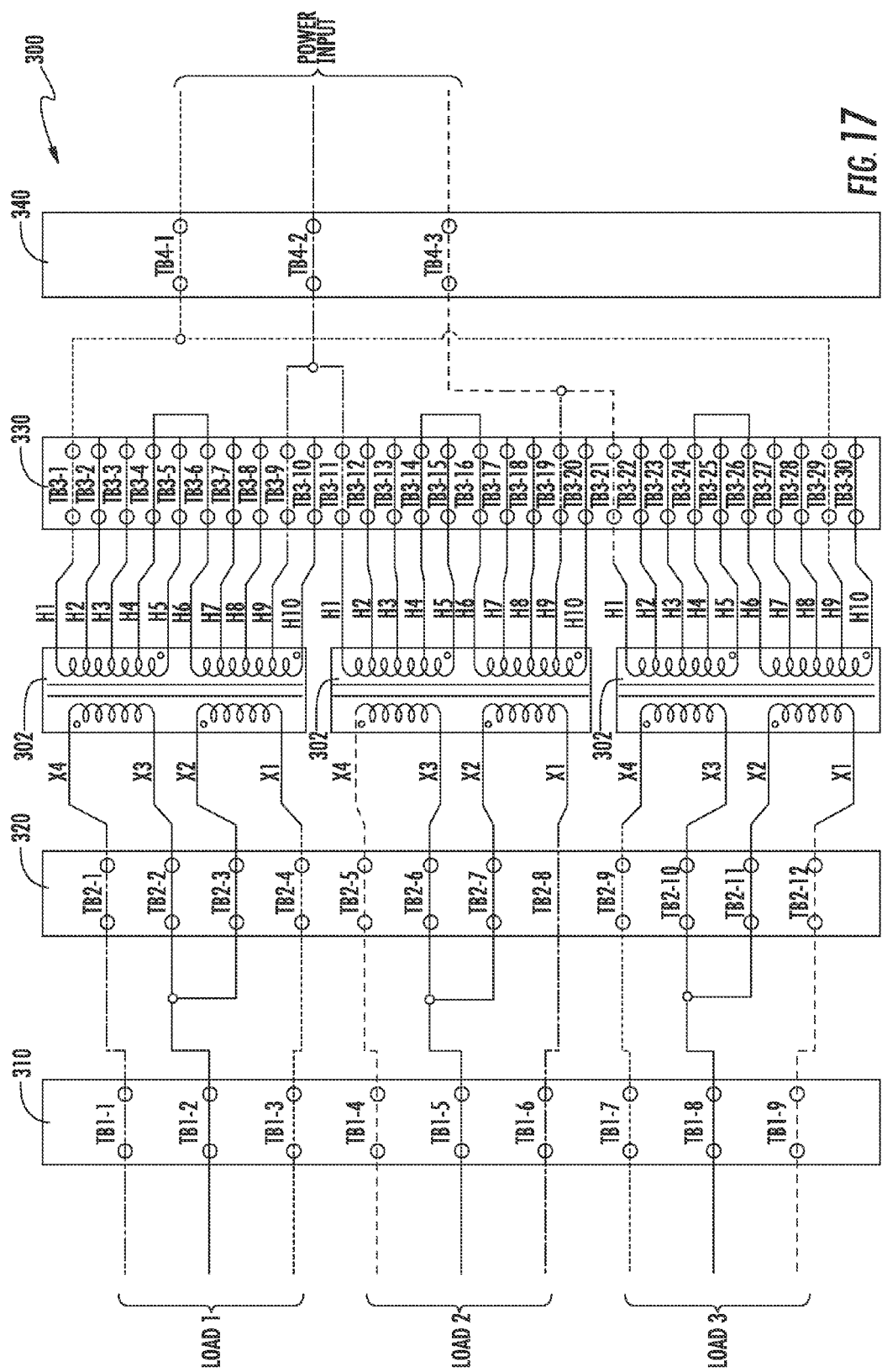
FIG. 17 depicts a fifteenth example configuration of a universal power conversion device according to an example embodiment of the present disclosure.

FIG. 17 depicts a fifteenth example configuration of a universal power conversion device according to an example embodiment of the present disclosure. In particular, the fifteenth example configuration allows for the transformation of a 417 to 440 VAC, three phase input signal into three 240 VAC, single phase output signals.

Figure 18:
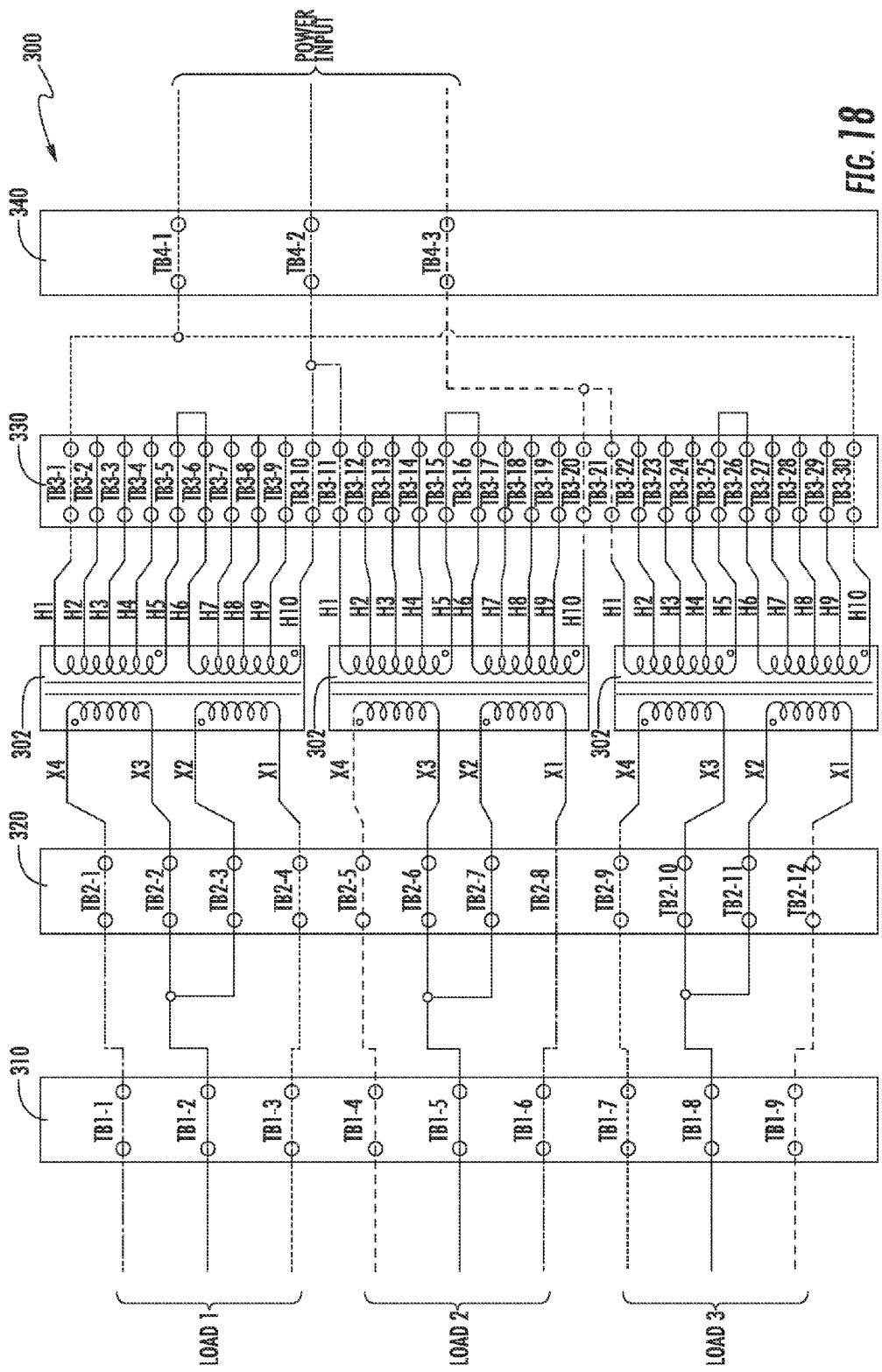
FIG. 18 depicts a sixteenth example configuration of a universal power conversion device according to an example embodiment of the present disclosure.

FIG. 18 depicts a sixteenth example configuration of a universal power conversion device according to an example embodiment of the present disclosure. In particular, the sixteenth example configuration allows for the transformation of a 441 to 480 VAC, three phase input signal into three 240 VAC, single phase output signals.

Figure 19:
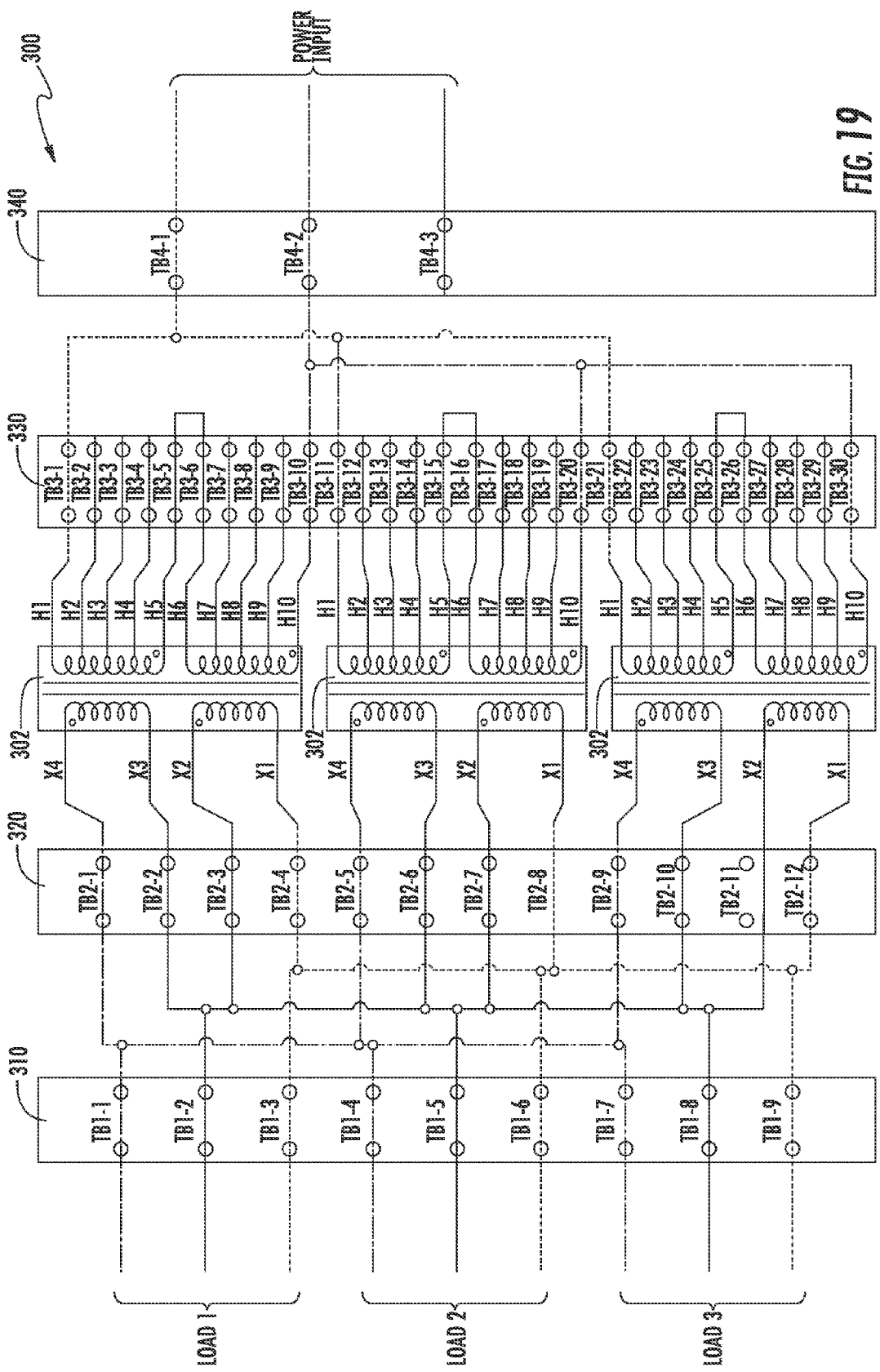
FIG. 19 depicts a seventeenth example configuration of a universal power conversion device according to an example embodiment of the present disclosure.

FIG. 19 depicts a seventeenth example configuration of a universal power conversion device according to an example embodiment of the present disclosure. In particular, the seventeenth example configuration allows for the transformation of a 441 to 480 VAC, single phase input signal into three 240 VAC, single phase output signals.

Furthermore, due to the electrical connection of terminals TB1-1, TB1-4, and TB1-7; TB1-2, TB1-5, and TB1-8; and TB1-3, TB1-6, and TB1-9 on the input side of the first terminal block, the three output signals can be combined in parallel to provide current sharing across the first, second, and third transformers, while preserving the ability of three independent loads to be respectively connected to terminals TB1-1, TB1-2, and TB1-3; TB1-4, TB1-5, and TB1-6; and TB1-7, TB1-8, and TB1-9. The above noted variation to provide paralleled output signals and current sharing can be applied to any of the example configurations provided herein.

Furthermore, although the FIGS. of the present disclosure depict the fourth terminal block receiving the input alternating current signal through a delta configuration, some example configurations of the present disclosure can be modified to accommodate a wye input connection. As examples, for three phase configurations receiving input voltages in the range of 348 to 480 (e.g. as shown in FIGS. 15-18), a wye input connection can be accommodated by electrically connecting terminals TB3-5, TB3-6, TB3-15, TB3-16, TB3-25, and TB3-26 to the neutral of the wye input.

Furthermore, although the FIGS. of the present disclosure depict the fourth terminal block receiving the input alternating current signal with no neutral, some example configurations of the present disclosure can be modified to accommodate a neutral input connection. As examples, for single phase configurations receiving input voltages in the range of 348 to 480 (e.g. as shown in FIGS. 7-10 and 19), a neutral input connection can be accommodated by electrically connecting terminals TB3-5, TB3-6, TB3-15, TB3-16, TB3-25, and TB3-26 to the neutral of the single phase input.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power conversion device comprising:
   a plurality of transformers; and
   a plurality of terminal blocks;
   wherein the plurality of terminal blocks comprise at least an AC input terminal block for receiving an input alternating current signal and a primary coil terminal block, the primary coil terminal block having a plurality of output terminals respectively connected to a plurality of taps of a plurality of primary coils of the plurality of transformers; and
   wherein a plurality of jumpers respectively providing electrical connection between respective output terminals of the AC input terminal block and input terminals of the primary coil terminal block are selectively reconfigurable for reconfiguring a power conversion applied to the input alternating current signal by the power conversion device;
   wherein the plurality of terminal blocks further comprise:
   a secondary coil terminal block having a plurality of input terminals respectively connected to a plurality of taps of a plurality of secondary coils of the plurality of transformers; and
   an AC output terminal block for outputting one or more output alternating current signals.

2. The power conversion device of claim 1, wherein the AC input terminal block receives the input alternating current signal from an energy storage system.

3. The power conversion device of claim 2, wherein:
   the energy storage system comprises a plurality of batteries and an inverter;
   the plurality of batteries configured to provide a direct current signal to the inverter; and
   the inverter configured to convert the direct current signal into the input alternating current signal to provide to the AC input terminal block.

4. The power conversion device of claim 1, wherein the plurality of transformers comprise a plurality of multi-tap transformers.

5. The power conversion device of claim 1, wherein the plurality of transformers comprise a first transformer, a second transformer, and a third transformer, and wherein each of the first, second, and third transformers comprises:
   a first and second primary coil, each of the first and second primary coils having a first, second, third, fourth, and fifth tap; and
   a first and second secondary coil, each of the first and second secondary coils having a first and second tap.

6. The power conversion device of claim 1, wherein the plurality of jumpers are selectively reconfigurable to provide a series output connection.

7. The power conversion device of claim 1, wherein the plurality of jumpers are selectively reconfigurable to provide a parallel output connection.

8. The power conversion device of claim 1, wherein the plurality of jumpers are selectively reconfigurable to provide a wye output connection for a three phase load.

9. The power conversion device of claim 1, wherein the plurality of jumpers are selectively reconfigurable to provide a delta output connection for a three phase load.

10. A method for operating a power conversion device, the power conversion device comprising a plurality of transformers, an AC input terminal configured to receive an input alternating current signal and a primary coil terminal block that has a plurality of output terminals respectively connected to a plurality of taps of a plurality of primary coils of the plurality of transformers, the method comprising:
    accessing the power conversion device;
    reconfiguring a plurality of jumpers respectively providing electrical connection between respective output terminals of the AC input terminal block and input terminals of the primary coil terminal block to reconfigure a power conversion applied to the input alternating current signal by the power conversion device;
    prior to reconfiguring the plurality of jumpers respectively providing electrical connection between respective output terminals of the AC input terminal block and input terminals of the primary coil terminal block to reconfigure the power conversion applied to the input alternating current signal:
    determining a first voltage and a first phase characteristic associated with the input alternating current signal; and
    determining a desired load voltage associated with an output alternating current signal;
    wherein the plurality of jumpers are reconfigured based at least in part on the first voltage, the first phase characteristic, and the desired load voltage.

11. The method of claim 10, further comprising receiving the input alternating current signal from an energy storage system, wherein the energy storage system comprises a plurality of batteries and an inverter.

12. The method of claim 11, wherein receiving the input alternating current signal from the energy storage system comprises receiving the input alternating current signal from the inverter, wherein the inverter converts a direct current signal from the plurality of batteries into the input alternating current signal.

13. The method of claim 10, wherein reconfiguring the plurality of jumpers to reconfigure the power conversion applied to the input alternating current signal comprises reconfiguring the plurality of jumpers such that the power conversion device performs one or more of load leveling, peak shaving, frequency regulation, peak shifting, firming, and arbitrage.

14. The method of claim 10, further comprising:
determining a desired load phase characteristic;
wherein the plurality of jumpers are reconfigured based at least in part on the first voltage, the first phase characteristic, the desired load voltage, and the desired load phase characteristic.

15. The method of claim 10, wherein the plurality of jumpers are reconfigured to provide a series output connection.

16. The method of claim 10, wherein the plurality of jumpers are reconfigured to provide a parallel output connection.

17. The method of claim 10, wherein the plurality of jumpers are reconfigured to provide a wye output connection for a three-phase load.

18. The method of claim 10, wherein the plurality of jumpers are reconfigured to provide a delta output connection for a three-phase load.

\* \* \* \* \*